United States Patent [19]

Williams

[11] 4,379,063

[45] Apr. 5, 1983

[54] NOVEL FUNCTIONAL FLUID

[75] Inventor: Mark A. Williams, Cincinnati, Ohio

[73] Assignee: Cincinnati Milacron Inc., Cincinnati, Ohio

[21] Appl. No.: 236,330

[22] Filed: Feb. 20, 1981

[51] Int. Cl.³ .................... C09K 15/22; C10M 1/06; C10M 3/04; C23F 11/10

[52] U.S. Cl. .................... 252/33.6; 252/34.7; 252/49.3; 252/49.5; 252/51.5 A; 252/77; 252/356; 252/392

[58] Field of Search .................... 252/33.6, 49.3, 49.5, 252/51.5 A, 77, 356, 392, 34.7

[56] References Cited

U.S. PATENT DOCUMENTS

| | | | |
|---|---|---|---|
| 2,718,503 | 9/1955 | Rocchini | 252/51.5 |
| 3,108,962 | 10/1963 | Buehler et al. | 252/33.6 |
| 3,121,057 | 2/1964 | Gee et al. | 252/33.6 |
| 3,183,069 | 5/1965 | Udelhofen | 44/71 |
| 3,200,075 | 8/1965 | Anderson | 252/51.5 |
| 3,219,666 | 11/1965 | Norman et al. | 260/268 |
| 3,251,776 | 5/1966 | Gee et al. | 252/77 |
| 3,256,196 | 6/1966 | Eickemeyer et al. | 252/51.5 |
| 3,259,578 | 7/1966 | Dickson et al. | 252/34 |
| 3,427,245 | 2/1969 | Hotten | 252/34.7 |
| 3,785,981 | 1/1974 | Hotten | 252/51.5 A |
| 3,806,456 | 4/1974 | Vogel | 252/51.5 A |
| 3,859,221 | 1/1975 | Polk | 252/51.5 A |
| 4,039,462 | 8/1977 | McCoy | 252/51.5 A |
| 4,053,426 | 10/1977 | Davis et al. | 252/34 |
| 4,138,346 | 2/1979 | Nassry | 252/32.5 |
| 4,239,635 | 12/1980 | Rieder | 252/34 |
| 4,273,664 | 6/1981 | Brandolese | 252/49.5 |

*Primary Examiner*—Dennis L. Albrecht
*Attorney, Agent, or Firm*—Donald Dunn

[57] ABSTRACT

Corrosion inhibiting aqueous functional fluids having high stability are provided which contain (a) water, (b) a corrosion inhibiting, surface active, water soluble or dispersible alkali metal, ammonium or organic amine salt of a water insoluble carboxylic acid group terminated monoamide, (c) a second surface active agent and optionally, (d) water soluble or dispersible lubricant. These functional fluids are useful as a metal working fluid or hydraulic fluid.

6 Claims, No Drawings

NOVEL FUNCTIONAL FLUID

This invention relates to aqueous functional fluid compositions particularly adapted for uses such as metal working compositions and hydraulic fluid compositions. In another of its aspects, this invention relates to aqueous lubricant compositions.

BACKGROUND

Various types of materials are used as functional fluids and functional fluids of various compositions find utility in many different applications. Among such applications are included electronic coolants, hydraulic fluids, metal working fluids, lubricants, damping fluids, heat transfer fluids and diffusion pump fluids. Aqueous functional fluids, for such uses as lubricants, metal working fluids and hydraulic fluids, have been gaining importance over non-aqueous (e.g. mineral oil based compositions) functional fluids because of their economic, environmental and safety advantages, as well as their performance. As metal working fluids aqueous functional fluids have been used in chip forming and non-chip forming metal working processes well known in the art, such as drilling, tapping, broaching, grinding, rolling, drawing, spinning, milling, bending and stamping. The demand for aqueous type hydraulic fluids has been increasing because of the economic and safety (e.g. high non-flammability) advantages of such fluids over non-aqueous oil type hydraulic fluids. The increasing cost of petroleum products in recent years has served to emphasize the economic advantage of aqueous functional fluids over non-aqueous, oil type, functional fluids and has accelerated the demand for aqueous functional fluids.

To take full advantage of their economic, environmental and safety advantages, aqueous functional fluids must not only provide the necessary functions in the particular use to which they are put, but they must also exhibit numerous other properties such as, for example, high stability during storage and use, resistance to decomposition and anti corrosion. These properties are particularly important to the life and appearance of the metal components of metal working apparatus and hydraulic systems and to the useful life of the aqueous functional fluids. When used as a metal working fluid, for example, the aqueous functional fluid should not only provide the necessary cooling and lubricating functions, but it also desirably should be highly resistant to separation of its components during storage and use and it should provide protection against corrosion of the work piece and the metal working apparatus (e.g. bearings, shafts, slides, tools, etc). Where an aqueous functional fluid would be employed as a hydraulic fluid it not only should meet the requirements of viscosity control, thermal stability, mechanical stability and lubrication but among other things it also desirably should be stable during storage and inhibit the corrosion of the components of the hydraulic system (e.g. pumps, valves, tubing, cylinders and pistons).

Although numerous aqueous metal working fluids and aqueous hydraulic fluids are known in the art, those aqueous fluids have not entirely met the performance demands placed upon them by their users and often have been found wanting in various properties such as, for example, storage stability, stability during use and corrosion protection. Improved aqueous functional fluids are needed which overcome stability and corrosion problems of the prior art aqueous functional fluids.

One way to reduce problems, such as stability problems, in functional fluids is to reduce the number of components of such fluids by using multifunctioning materials (e.g. materials having combined bacteriocidal and anti-corrosion activity, combined emulsifier and bacteriocidal activity or emulsifier and anti-corrosion activity). Since multifunctional materials can reduce the number of components of functional fluid formulations they simplify such formulations and the processes for their preparation. This invention makes use of a multifunctional component having surface active and corrosion inhibiting activities not previously recognized by the prior art.

It is an object of this invention to overcome the disadvantages of prior art aqueous functional fluids. Another object of this invention is to provide a highly stable aqueous functional fluid imparting a high degree of corrosion protection.

SUMMARY OF THE INVENTION

It has now been discovered that the foregoing objects and others, as will be evident from the following description and claims, can be achieved by a corrosion inhibiting, aqueous functional fluid having a pH in the range of 8 to 14 comprising (a) water, (b) a surface active, corrosion inhibiting, water soluble or dispersible alkali metal, ammonium or organic amine salt of a water insoluble carboxylic acid terminated amide, (c) a second surface active agent and optionally (d) a water soluble or dispersible lubricant. Additionally, there has been discovered a method of imparting corrosion inhibiting activity to an aqueous functional fluid having a pH in the range of 8 to 14 comprising the step of mixing together a water soluble or dispersible alkali metal, ammonium or organic amine salt of a water insoluble carboxylic acid terminated amide, water, a surface active agent and optionally a water soluble or dispersible lubricant.

DESCRIPTION OF THE INVENTION

In accordance with this invention there is now provided a corrosion inhibiting, aqueous functional fluid composition having a pH in the range of 8 to 14, preferably 8 to 12, comprising (a) water, (b) a surface active corrosion inhibiting, water soluble or dispersible alkali metal, ammonium or organic amine salt of a water insoluble carboxylic acid terminated amide having one amide linkage

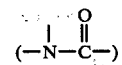

per molecule, (c) a second surface active agent and optionally (d) a water soluble or dispersible lubricant. Further, in accordance with this invention there is provided a method for imparting corrosion inhibiting activity to an aqueous functional fluid having a pH in the range of 8 to 14, preferably 8 to 12, comprising the step of mixing together a corrosion inhibiting effective amount of a surface active, corrosion inhibiting, water soluble or dispersible alkali metal, ammonium or organic amine salt of a water insoluble carboxylic acid terminated amide having one amide linkage

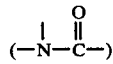

per molecule, water, a second surface active agent and optionally a water soluble or dispersible lubricant. As another aspect of this invention, there is provided a corrosion inhibiting, aqueous functional fluid composition having a pH in the range of 8 to 12 comprising (a) water, (b) a surface active, corrosion inhibiting, water soluble or dispersible alkali metal, ammonium or organic amine salt of a water insoluble carboxylic acid terminated amide having one amide linkage

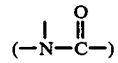

per molecule, (c) a second surface active agent and (d) a water soluble or dispersible lubricant. In a still further aspect of this invention there is provided a corrosion inhibiting, aqueous functional fluid composition having a pH in the range of 8 to 12 comprising (a) water, (b) a surface active, corrosion inhibiting, water soluble or dispersible organic amine salt of a water insoluble carboxylic acid terminated amide having one amide linkage

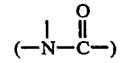

per molecule, (c) a second surface active agent and optionally (d) a water soluble or dispersible lubricant. In accordance with another aspect of this invention there is provided a corrosion inhibiting, aqueous functional fluid composition having a pH in the range of 8 to 12 comprising (a) water, (b) a surface active, corrosion inhibiting, water soluble or dispersible organic amine salt of a water insoluble carboxylic acid terminated amide having one amide linkage

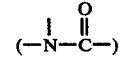

per molecule, (c) a second surface active agent and (d) a water soluble or dispersible lubricant.

The surface active, corrosion inhibiting, water soluble or dispersible alkali metal, ammonium or organic amine salt of a water insoluble carboxylic acid group terminated amide having one amide linkage

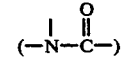

per molecule used in the practice of the compositions and methods of this invention may be described by the following formula

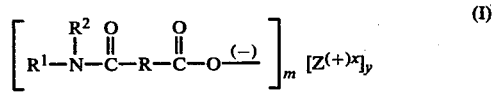

wherein:

R is a divalent radical selected from the group consisting of a monoethylenically unsaturated $C_2$ to $C_3$ aliphatic radical having two free valences in a cis stereo configuration, a $C_4$ to $C_8$ cycloaliphatic radical or an aromatic radical, $R^1$ is a monovalent organic radical selected from the group consisting of
  (a) a monovalent $C_7$ to $C_{10}$ aliphatic group having at least one methyl or ethyl branch or a monovalent heteroaliphatic group having at least one methyl or ethyl branch and the formula $R^3+OR^4)_n$ (II) wherein $R^3$ is a straight chain or a methyl or ethyl branched $C_6$ to $C_{12}$ alkyl radical, $R^4$ is a $C_2$ to $C_3$ alkylene radical and n is 1 to 2 when R is the monoethylenically unsaturated $C_2$ to $C_3$ aliphatic radical and $R^2$ is hydrogen,
  (b) a monovalent $C_7$ to $C_{10}$ aliphatic radical having at least one methyl or ethyl branch when R is the cycloaliphatic or aromatic group and $R^2$ is hydrogen,
  (c) a monovalent $C_1$ to $C_{11}$ straight or branched chain aliphatic radical when R is the monoethylenically unsaturated $C_2$ to $C_3$ aliphatic radical and $R^2$ is a $C_1$ to $C_{11}$ straight or branched chain monovalent aliphatic radical with the proviso that $R^1 + R^2$ shall have a combined total of from 8 to 12 carbon atoms and at least one of $R^1$ or $R^2$ shall have at least 5 carbon atoms, or
  (d) a monovalent $C_1$ to $C_9$ straight or branched chain aliphatic group when R is the cycloaliphatic or aromatic group and $R^2$ is a monovalent $C_1$ to $C_9$ straight or branched chain aliphatic group with the proviso that $R^1 + R^2$ shall have a combined total of from 7 to 10 carbon atoms and at least one of $R^1$ or $R^2$ has at least 4 carbon atoms $R^2$ is hydrogen or a $C_1$ to $C_{11}$ branched or straight chain alkyl group Z is an alkali metal cation or a nitrogen containing cation having at least one hydrogen attached to the nitrogen, a positive charge equal to x and selected from the group consisting of ammonium cation and cations of a water soluble alkanol amine having 2 to 4 carbon atoms in the alkanol group, $C_2$ to $C_6$ alkyl amine, alkyl alkanol amine having 1 to 6 carbon atoms in the alkyl group and 2 to 4 atoms in the alkanol group, heteroaliphatic monoamine in which the heteroatom is an oxygen atom, heteroaliphatic polyamine having oxygen or nitrogen heteroatoms, alkylene diamine having 2 to 6 carbon atoms in the alkylene group, N-alkyl or N-hydroxyalkyl substituted alkylene diamine having 2 to 6 carbon atoms in the alkylene group, morpholine, N-alkyl substituted morpholine or N-aminoalkyl substituted morpholine.

x is 1 to 3 y is 1, and m is 1 to 3.

Thus, in accordance with one embodiment of this invention there is provided a corrosion inhibiting, aqueous functional fluid composition having a pH in the range of 8 to 12 comprising (a) water, (b) a surface active, corrosion inhibiting salt according to formula (I) wherein R is the monoethylenically unsaturated $C_2$ to $C_3$ aliphatic radical having two free valences in a cis stereo configuration, (c) a second surface active agent and optionally (d) a water soluble or dispersible lubricant. As further non-limiting embodiments of this invention there includes, for example, a corrosion inhibiting, aqueous functional fluid having a pH in the range of 8 to 12 comprising water, a second surface active agent, optionally a water soluble or dispersible lubricant and a surface active, corrosion inhibiting salt according to formula (I) wherein ① R is the $C_4$ to $C_8$ cycloaliphatic radical, or ② R is the aromatic radical, or ③ $R^1$ as a monovalent $C_7$ to $C_{10}$ aliphatic group having at least one methyl or ethyl branch, or ④ $R^1$ is a monovalent heteroaliphatic group having at least one methyl or ethyl branch and the formula (II), or ⑤ R is a monoethylenically unsaturated $C_2$ to $C_3$ aliphatic radical having two free valences in a cis stereo configuration and $R^1$ is a monovalent $C_7$ to $C_{10}$ aliphatic group having at least one methyl or ethyl branch, or ⑥ R is a monoethylenically unsaturated $C_2$ to $C_3$ aliphatic radical having two free valences in a cis stereo configuration and $R^1$ is a monovalent heteroaliphatic group having at least one methyl or ethyl branch and the formula (II), or ⑦ R is a $C_4$ to $C_8$ cycloaliphatic radical and $R^1$ is a monovalent $C_7$ to $C_{10}$ aliphatic group having at least one methyl or ethyl branch, or ⑧ R is a $C_4$ to $C_8$ cycloaliphatic radical and $R^1$ is a $C_1$ to $C_9$ straight or branched chain monovalent aliphatic group or ⑨ R is the aromatic radical and $R^1$ is the monovalent $C_1$ to $C_9$ straight or branched chain aliphatic group or ⑩ R is the aromatic radical and $R^1$ is the $C_7$ to $C_{10}$ monovalent aliphatic radical having at least one methyl or ethyl branch or ⑪ Z is the ammonium cation, or ⑫ Z is the alkanol amine cation, or ⑬ Z is the alkyl amine cation, or ⑭ Z is the alkyl alkanol amine cation or ⑮ Z is the alkali metal cation or ⑯ Z is the heteroaliphatic polyamine cation in which the heteroatom is oxygen or nitrogen.

Additional non-limiting embodiments of the functional fluid composition of this invention include, for example, a corrosion inhibiting, aqueous functional fluid having a pH in the range of 8 to 12 comprising water, a second surface active agent, a water soluble or dispersible lubricant and a surface active, corrosion inhibiting salt according to formula (I) where ⑰ R is the monoethylenically unsaturated $C_2$ to $C_3$ aliphatic radical having two free valences in a cis stereo configuration and $R^1$ is the monovalent $C_7$ to $C_{10}$ aliphatic group having at least one methyl or ethyl branch, or ⑱ R is the monoethylenically unsaturated $C_2$ to $C_3$ aliphatic radical having two free valences in a cis stereo configuration and $R^1$ is the monovalent heteroaliphatic group having at least one methyl or ethyl branch and the formula (II), or ⑲ R is the $C_4$ to $C_8$ cycloaliphatic radical and $R^1$ is the monovalent $C_7$ to $C_{10}$ aliphatic group having at least one methyl or ethyl branch, or ⑳ R is the $C_4$ to $C_8$ cycloaliphatic radical and $R^1$ is the monovalent $C_1$ to $C_9$ straight or branched chain aliphatic group or ㉑ R is the aromatic radical and $R^1$ is the monovalent $C_7$ to $C_{10}$ aliphatic group having at least one methyl or ethyl branch, or ㉒ R is the aromatic radical and $R^1$ is the monovalent $C_1$ to $C_9$ straight or branched chain alkyl, or ㉓ Z is the alkanol amine cation, or ㉔ Z is the ammonium cation, or 25 Z is the alkyl amine cation, or ㉖ Z is a water soluble alkyl alkanol amine cation, or ㉗ Z is an alkali metal cation or ㉘ Z is a water soluble heteroaliphatic polyamine cation in which the heteroatom is nitrogen.

Non-limiting embodiments of the corrosion inhibiting, aqueous functional fluid composition of this invention of particular interest include, for example, a corrosion inhibiting, aqueous functional fluid composition having a pH in the range of 8 to 12 comprising water, a second surface active agent, a water soluble or dispersible lubricant and a surface active corrosion inhibiting salt according to formula (I) wherein ㉙ R is the monoethylenically unsaturated $C_2$ to $C_3$ aliphatic radical having two free valences in a cis stereo configuration, $R^1$ is the monovalent $C_7$ to $C_{10}$ aliphatic group having at least one methyl or ethyl branch and Z is the water soluble alkanol amine cation having 2 to 4 carbon atoms in the alkanol group, or ㉚ R is the monoethylenically unsaturated $C_2$ to $C_3$ aliphatic radical having two free valences in a cis stereo configuration, $R^1$ is the monovalent heteroaliphatic group having at least one methyl or ethyl branch and the formula (II) and Z is the water soluble alkanol amine cation having 2 to 4 carbon atoms in the alkanol group or ㉛ R is the monoethylenically unsaturated $C_2$ to $C_3$ aliphatic radical having two free valences in a cis stereo configuration, $R^1$ is the monovalent $C_7$ to $C_{10}$ aliphatic group having at least one methyl or ethyl branch and Z is the water soluble alkyl amine cation or ㉜ R is the monoethylenically unsaturated $C_2$ to $C_3$ aliphatic radical having two free valences in a cis stereo configuration, $R^1$ is the monovalent heteroaliphatic group having at least one methyl or ethyl branch and the formula (II) and Z is the water soluble alkyl amine cation or ㉝ R is the monoethylenically unsaturated $C_2$ to $C_3$ aliphatic group having two free valences in a cis stereo configuration, $R^1$ is the monovalent $C_7$ to $C_{10}$ aliphatic group having at least one methyl or ethyl branch and Z is the water soluble alkyl alkanol amine cation or ㉞ R is the monoethylenically unsaturated $C_2$ to $C_3$ aliphatic group having two free valences in a cis stereo configuration, $R^1$ is the monovalent heteroaliphatic group having at least one methyl or ethyl branch and the formula (II) and Z is the water soluble alkyl alkanol amine cation or ㉟ R is the $C_4$ to $C_8$ cycloaliphatic radical, $R^1$ is the $C_7$ to $C_{10}$ aliphatic group having at least one methyl or ethyl branch and Z is the water soluble alkanol amine cation or ㊱ R is a $C_4$ to $C_8$ cycloaliphatic group, $R^1$ is a monovalent $C_1$ to $C_9$ straight or branched chain aliphatic group. Preferably the corrosion inhibiting, aqueous functional fluid having a pH in the range of 8 to 12 according to this invention comprises water, a second surface active agent, a water soluble or dispersible lubricant and a surface active, corrosion inhibiting salt according to formula (I) where R is the monoethylenically unsaturated $C_2$ to $C_3$ aliphatic group having two free valences in a cis stereo configuration, $R^1$ is the $C_7$ to $C_{10}$ aliphatic group having at least one methyl or ethyl branch or the monovalent heteroaliphatic group having at least one methyl or ethyl branch and the formula (II), $R^2$ is hydrogen and Z is the alkanol amine cation.

In the context of this invention and as used in this disclosure and claims when R is the monoethylenically unsaturated $C_2$ to $C_3$ aliphatic group having two free valences in a cis stereo configuration, there is meant that such $C_2$ to $C_3$ aliphatic group shall be the divalent cis geometric isomer radical such as, for example, the cis ethenylene radical and cis 1,2-propenylene radical. R may be $C_4$ to $C_8$ cycloaliphatic group having two free valences in a cis or trans stereo configuration such as, for example, 1-3-cyclobutylene, 1,3-cyclopentylene, 2-cyclopenten-1,4-ylene, 1,4-cyclohexylene, 1,2-cyclohexylene, 2-cyclohexen-1,4-ylene, 4-cyclohexen-1,2-ylene, 2,5-cyclohexadien-1,4-ylene, 2-methyl-1,4-cyclohexylene, 3,5-dimethyl-1,4-cyclohexylene. When R is an aromatic group having two free valences in a cis or trans stereo configuration there may be used, for example, p-phenylene, o-phenylene or m-phenylene.

Where $R^1$ is a $C_7$ to $C_{10}$ aliphatic radical having at least one methyl or ethyl branch there may be used, for example, a 2-ethyl hexyl, 1,5-dimethyl hexyl, 1-methyl hexyl, 1-methyl heptyl, or 1,1,3,3-tetramethyl butyl group. Preferably when $R^1$ is a $C_7$ to $C_{10}$ aliphatic radical having at least one methyl or ethyl branch such radical is a hydrocarbon radical. As $R^1$ there may be used a heteroaliphatic radical having at least one methyl or ethyl branch and the formula $R^3\text{-}(OR^4)_n$ examples of which may include 3-(2-ethylhexoxy) propyl and 1,3-dimethyl-2,4-dioxahexadec-1-yl radicals and radicals according to the formula $R^3\text{-}(OR^4)_n$ wherein $R^3$ is isohexyl, $R^4$ is ethylene and n is 2; $R^3$ is octyl, $R^4$ is 1,2 propylene and n is 2; $R^3$ is 2-ethyl hexyl, $R^4$ is 1,2-propylene and n is 2; $R^3$ is dodecyl, $R^4$ is 1,2-propylene and n is 1 and $R^3$ is decyl, $R^4$ is ethylene and n is 2. $R^1$ radicals according to the formula $R^3\text{-}(OR^4)_n$ include also polyoxyalkylene copolymer chain radicals terminated at one end by an alkoxy group such as, for example, poly(oxyethylene/oxypropylene) copolymer chain radical having 2 oxyalkylene units terminated at one end by an octoxy group. Where $R^2$ is a $C_1\text{-}C_{11}$ alkyl radical such radical may be branched or straight chain and include, for example, methyl, ethyl, propyl, isopropyl, butyl, isobutyl, pentyl, isopentyl, 2-ethyl hexyl, decyl and undecyl radicals.

There may be used as the Z cation having a positive charge equal to (x), water soluble alkanol amine cations such as, for example, water soluble alkanol amine cations of the formula $HN^{\oplus}(R^6)(R^7)(R^8)$ wherein $R^6$ and $R^7$ are independently hydrogen or $C_2$ to $C_4$ alkylol group and $R^8$ is a $C_2$ to $C_4$ alkylol group including where $R^6$, $R^7$ and $R^8$ are as follows:

| $R^6$ | $R^7$ | $R^8$ |
|---|---|---|
| H | H | hydroxyethyl |
| H | hydroxyethyl | hydroxyethyl |
| hydroxyethyl | hydroxyethyl | hydroxyethyl |
| H | H | 3-hydroxypropyl |
| H | 2-hydroxypropyl | 2-hydroxypropyl |
| 3-hydroxypropyl | 3-hydroxypropyl | 3-hydroxypropyl |
| H | hydroxyethyl | hydroxypropyl |
| H | H | 4-hydroxybutyl |
| H | 4-hydroxybutyl | 4-hydroxybutyl |
| 4-hydroxybutyl | 4-hydroxybutyl | 4-hydroxybutyl |
| hydroxyethyl | 3-hydroxypropyl | 4-hydroxybutyl |
| H | H | 3-hydroxybutyl |

Where Z is a water soluble alkyl amine cation having a charge equal to (x) there includes, for example, ethyl amine, diethyl amine, triethyl amine and isobutyl amine, cations. As Z there may be used a water soluble alkyl alkanol amine cation having 1 to 6 carbon atoms in the alkyl group, 2 to 4 carbon atoms in the alkanol group and a positive charge equal to (x), examples of which may include N-methyl hydroxyethyl amine, N,N-dimethyl hydroxyethyl amine, N-methyl di(hydroxyethyl) amine, N,N-dibutyl 3-hydroxypropyl amine, N-isobutyl-4-hydroxybutyl amine and N-ethyl hydroxyethyl amine cations. When Z is a water soluble alkylene diamine cation having 2 to 6 carbon atoms in the alkylene group and a positive charge equal to (x), the nitrogen atoms may be unsubstituted or may have a total of from 1 to 4 $C_1$ to $C_4$ alkyl or $C_1$ to $C_4$ hydroxyalkyl substituents individually or in combination, including, for example, ethylene diamine, 1,3-propylene diamine, 1,6-hexamethylene diamine, N,N-dimethyl amino propyl amine, hydroxyethyl ethylene diamine, N,N,N',N' tetrakis (2-hydroxyethyl) ethylene diamine, N,N,N'N' tetramethyl ethylene diamine and N-propyl-N'-hydroxybutyl-1,6-hexamethylene diamine cation. Where Z is a water soluble heteroaliphatic monoamine cation such cation may be described by the formula $HN^{\oplus}(R^9)(R^{10})(R^{11})$ [V] wherein $R^9$ and $R^{10}$ are independently hydrogen or $-(R^{12}\text{-}O)_q R^{13}$ [VI] and $R^{11}$ is $-(R^{12}\text{-}O)_q R^{13}$ wherein $R^{12}$ is $C_2$ to $C_3$ alkylene, $R^{13}$ is $C_1$ to $C_{12}$ alkyl or alkoxy alkyl and q is 1 to 20 including examples wherein

| $R^9$ | $R^{10}$ | $R^{11}$ | $R^{12}$ | $R^{13}$ | q |
|---|---|---|---|---|---|
| H | H | $-(R^{12}\text{-}O)_q R^{13}$ | $C_2H_4$ | $C_2H_5$ | 2 |
| H | $-(R^{12}\text{-}O)_q R^{13}$ | $-(R^{12}\text{-}O)_q R^{13}$ | $C_3H_6$ | $C_4H_9$ | 2 |
| H | H | $-(R^{12}\text{-}O)_q R^{13}$ | $C_3H_6$ | $C_3H_7$ | 10 |
| H | H | $-(R^{12}\text{-}O)_q R^{13}$ | $C_2H_4$ | $C_{12}H_{25}$ | 15 |
| $-(R^{12}\text{-}O)_q R^{13}$ | $-(R^{12}\text{-}O)_q R^{13}$ | $-(R^{12}\text{-}O)_q R^{13}$ | $C_3H_6-$ | $CH_3-$ | 20 |
| H | H | $-(R^{12}\text{-}O)_q R^{13}$ | $C_2H_4-$ | $C_3H_7-$ | 8 |
| H | H | $-(R^{13}\text{-}O)_q R^{13}$ | $C_2H_4-$ | $C_4H_9-$ | 20 |
| H | H | $-(R^{13}\text{-}O)_q R^{13}$ | $C_3H_6-$ | $CH_3O-C_2H_4-$ | 8 |

In accordance with formula (I) Z can be a water soluble heteroaliphatic polyamine cation wherein the heteroatoms are oxygen or nitrogen. Such water soluble heteroaliphatic polyamine cations include polyoxyalkylene diamine cations wherein one or both amine nitrogen atoms carry a positive charge and the alkylene radical contains 2 to 3 carbon atoms and polyalkylene polyamines having 3 to 6 nitrogen atoms one to three of said nitrogen atoms carrying a positive charge, and the alkylene group having 2 to 3 carbon atoms. As examples of the water soluble polyoxyalkylene diamine cations there include water soluble polyoxyethylene diamine cation having a positive charge on one nitrogen atom water soluble polyoxyethylene diamine cation having a positive charge on both nitrogen atoms, water soluble polyoxypropylene diamine cation having a positive charge on one nitrogen atom, water soluble polyoxypropylene diamine having a positive charge on both nitrogen atoms, copoly(oxyethylene/oxypropylene) diamine cation having a positive charge on one nitrogen atom, and copoly(oxyethylene/oxypropylene) diamine cation having a positive charge on both nitrogen atoms. The copoly(oxyalkylene/oxyalkylene) diamine cations include both block and random copolymers. Desirably the polyoxyalkylene diamine cation, including the copoly(oxyalkylene/oxyalkylene) diamine cation, have an average molecular weight of from about 130 to 2000. Wherein Z is a water soluble polyalkylene polyamine cation having from 3 to 6 nitrogen atoms, one to three of said nitrogen atoms carrying a positive charge, and the alkylene group having from 2 to 3 carbon atoms there include, for example, diethylene triamine cation having a positive charge on one terminal nitrogen atom, diethylene triamine cation having a positive charge on both terminal nitrogen atoms, diethylene triamine cation having a positive charge on all three nitrogen atoms, triethylene tetramine cation having a positive charge on one terminal nitrogen atom, tetraethylene pentamine having a positive charge on both terminal nitrogen atoms, pentaethylene hexamine cation having a positive charge on each of the two terminal nitrogen atoms and a positive charge on one of the chain nitrogen atoms, dipropylene triamine cation having a positive charge on one terminal nitrogen atom and N,N-bis-(3-aminopropyl) methyl amine cation having a positive charge on both terminal nitrogen atoms. Preferably Z is a water soluble alkanol amine cation and more preferably a water soluble monoalkanol amine cation or trialkanol amine cation. In the context of this invention and as used in this disclosure and the claims, the Z of formula (I) and the examples of Z include the carboxylic acid group hydrogen atom imparting the cationic character to the nitrogen atom of the Z moiety. Where Z is an alkali metal cation such cation is preferably a sodium or potassium cation. The alkali metal cation may be obtained from well known water soluble inorganic or organic alkali metal compounds (e.g. alkali metal salts of inorganic acids and alkali metal hydroxides).

Salts according to formula (I) may, for example, include salts (A) wherein R is

and $R^1$, $R^2$, Z, x, y and m are as shown in Table (A) below, (B) wherein R is

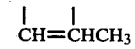

and $R^1$, $R^2$, Z, x, y and m are as shown in Table (B) below, (C) wherein R is cyclohexa-1,4-ylene and $R^1$, $R^2$, Z, x, y and m are as shown in Table (C) below, (D) wherein R is cyclohexa-1,2-ylene and $R^1$, $R^2$, Z x, y and m are as shown in Table D below, (E) wherein R is 1,4-phenylene and $R^1$, $R^2$, Z, x, y and m are as shown in Table (E) below and (F) wherein R is 1,2-phenylene and $R^1$, $R^2$, Z, x, y and m are as shown in Table F below.

TABLE A

| No. | $R^1$ | $R^2$ | Z | x | y | m |
|---|---|---|---|---|---|---|
| A-1 | $CH_3CH(CH_3)CH_2CH_2-CH_2-CH_2-$ | H | $HOC_2H_4NH_3^\oplus$ | 1 | 1 | 1 |
| A-2 | $CH_3CH(C_2H_5)C_4H_8-$ | H | $HOC_3H_6NH_3^\oplus$ | 1 | 1 | 1 |
| A-3 | $CH_3C(CH_3)_2CH_2C(CH_3)_2-$ | H | $(HOC_2H_4)_2NH_2^\oplus$ | 1 | 1 | 1 |
| A-4 | $CH_3(CH_2)_4CH(CH_3)-$ | H | $(HOC_2H_4)_3NH^\oplus$ | 1 | 1 | 1 |
| A-5 | $CH_3CH(CH_3)CH_2CH_2-CH(CH_3)-$ | H | $C_2H_4[N^\oplus H_3]_2$ | 2 | 1 | 2 |
| A-6 | $CH_3(CH_2)_3CH(C_2H_5)CH_2OC_3H_6-$ | H | $(HOC_3H_6)_2NH_2^\oplus$ | 1 | 1 | 1 |
| A-7 | $C_6H_{13}(OC_3H_6)_{\overline{2}}$ | H | $HOC_4H_8NH_3^\oplus$ | 1 | 1 | 1 |
| A-8 | $C_4H_9(OC_3H_6)_{\overline{1}}$ | H | $HOC_2H_4NH_3^\oplus$ | 1 | 1 | 1 |
| A-9 | $CH_3C(CH_3)_2C_3H_6-$ | H | $C_6H_{13}NH_3^\oplus$ | 1 | 1 | 1 |
| A-10 | $CH_3-C_4H_8-CH(CH_3)-$ | H | $HOC_2H_4NHC_2H_4NH_3^\oplus$ | 1 | 1 | 1 |
| A-11 | $CH_3CH(CH_3)(CH_2)_3CH(CH_3)CH_2CH_2-$ | H | $(HOC_2H_4)(CH_3)NH_2^\oplus$ | 1 | 1 | 1 |
| A-12 | $CH_3CH(CH_3)CH_2CH_2CH(C_2H_5)-$ | H | $HOC_2H_4OC_2H_4NH_3^\oplus$ | 1 | 1 | 1 |
| A-13 | $CH_3(CH_2)_4-$ | $CH_3(CH_2)_4-$ | $(HOC_2H_4)_2NH_2^\oplus$ | 1 | 1 | 1 |
| A-14 | $CH_3(CH_2)_8-$ | $CH_3-$ | $HOC_2H_4NH_3^\oplus$ | 1 | 1 | 1 |
| A-15 | $CH_3CH(CH_3)CH_2CH_2-$ | $CH_3CH_2CH_2-$ | $(CH_3)_2^\oplus NH(CH_2)_3^\oplus NH_3$ | 2 | 1 | 2 |

TABLE B

| No. | $R^1$ | $R^2$ | Z | x | y | m |
|---|---|---|---|---|---|---|
| B-1 | $CH_3CH(CH_3)C_3H_6CH(CH_3)-$ | H | $(HOC_2H_4)(HOC_3H_6)NH_2^\oplus$ | 1 | 1 | 1 |
| B-2 | $CH_3(CH_2)_3CH(C_2H_5)CH_2-$ | H | $HOC_2H_4NH_3^\oplus$ | 1 | 1 | 1 |
| B-3 | $CH_3C_{11}H_{22}OCH_2CH(CH_3)OCH_2CH(CH_3)-$ | H | $(C_2H_4)_2NH_2^\oplus$ | 1 | 1 | 1 |
| B-4 | $CH_3C_3H_6CH(C_2H_5)CH_2(O-C_2H_4)_{\overline{1}}$ | H | $HOC_3H_6NH_3^\oplus$ | 1 | 1 | 1 |
| B-5 | $CH_3CH(C_2H_5)CH_2CH_2CH_2-$ | H | $(HOC_2H_4)_3NH^\oplus$ | 1 | 1 | 1 |
| B-6 | $CH_3CH(CH_3)CH_2CH_2CH(CH_3)-$ | H | $H_3N^\oplus C_2H_4N^\oplus H_3$ | 2 | 1 | 2 |
| B-7 | $CH_3CH(C_2H_5)(CH_2)_3CH(CH_3)-$ | H | $HOC_2H_4NH_3^\oplus$ | 1 | 1 | 1 |
| B-8 | $CH_3CH(C_2H_5)CH_2CH_2-CH_2-$ | H | $HOC_4H_8NH_3^\oplus$ | 1 | 1 | 1 |
| B-9 | $CH_3C(CH_3)_2CH_2CH_2-CH_2CH_2-$ | H | $H_3N^\oplus C_2H_4N^\oplus H_2C_2H_4N^\oplus H_3$ | 3 | 1 | 3 |
| B-10 | $CH_3CH_2(OC_3H_6)_{\overline{3}}$ | H | $CH_3CH_2CH_2NH_3^\oplus$ | 1 | 1 | 1 |
| B-11 | $CH_3(CH_2)_5-$ | $CH_3(CH_2)_5-$ | $Na^\oplus$ | 1 | 1 | 1 |
| B-12 | $CH_3(CH_2)_6-$ | $CH_3-$ | $H_3N^\oplus C_3H_6N^\oplus H_3$ | 2 | 1 | 2 |
| B-13 | $CH_3(CH_2)_6-$ | $CH_3(CH_2)_3-$ | $C_6H_{13}(OC_2H_4)_5NH_3^\oplus$ | 1 | 1 | 1 |

TABLE C

| No. | $R^1$ | $R^2$ | Z | x | y | m |
|---|---|---|---|---|---|---|
| C-1 | $CH_3CH_2C(CH_3)_2CH_2CH_2-$ | H | $HOC_4H_8NH_3^\oplus$ | 1 | 1 | 1 |
| C-2 | $CH_3(CH_2)_8CH(CH_3)-$ | H | $HOC_2H_4NH_3^\oplus$ | 1 | 1 | 1 |
| C-3 | $C_4H_9-$ | $C_4H_9-$ | $(CH_3)_2CNH_3^\oplus$ | 1 | 1 | 1 |
| C-4 | $C_8H_{17}-$ | $C_2H_4-$ | $H_3N^\oplus-C_2H_4N^\oplus H_3$ | 2 | 1 | 2 |
| C-5 | $CH_3CH(C_2H_4)CH_2CH_2-$ | $CH_3CH(CH_3)CH_2$ | $(HOC_2H_4)(C_3H_7)NH_2^\oplus$ | 1 | 1 | 1 |
| C-6 | $(CH_3)_3CCH_2C(CH_3)_2-$ | H | $(HOC_3H_6)(C_2H_5)NH_2^\oplus$ | 1 | 1 | 1 |
| C-7 | $C_8H_{17}-$ | $CH_3$ | $H_3N^\oplus-C_3H_6NHC_3H_6N^\oplus H_3$ | 2 | 1 | 2 |
| C-8 | $CH_3CH(CH_3)C_3H_6CH(CH_3)-$ | H | $HOC_2H_4NHC_2H_4NH_3^\oplus$ | 1 | 1 | 1 |
| C-9 | $CH_3CH(C_2H_5)CH_2CH_2-$ | $CH_3$ | $(HOC_3H_6)_2NH_2^\oplus$ | 1 | 1 | 1 |
| C-10 | $CH_3CH(CH_3)(CH_2)_3CH(CH_3)CH_2CH_2-$ | H | $HOC_2H_4N^\oplus H_2C_2H_4N^\oplus H_2C_2H_4OH$ | 2 | 1 | 2 |

TABLE D

| No. | R¹ | R² | Z | x | y | m |
|---|---|---|---|---|---|---|
| D-1 | $CH_3CH(CH_3)CH_2CH_2CH_2-$ | H | $HOC_3H_6NH_3^{\oplus}$ | 1 | 1 | 1 |
| D-2 | $CH_3(CH_2)_6CH(CH_3)-$ | H | $HOC_4H_8NH_3^{\oplus}$ | 1 | 1 | 1 |
| D-3 | $CH_3(CH_2)_7CH(CH_3)-$ | H | $C_3H_6NH_3^{\oplus}$ | 1 | 1 | 1 |
| D-4 | $C_4H_9CH(CH_3)-$ | $CH_3$ | $H_3N^{\oplus}C_6H_{12}N^{\oplus}H_3$ | 2 | 1 | 2 |
| D-5 | $CH_3C(CH_3)_2CH_2C(CH_3)_2-$ | H | $(HOC_2H_4)(C_3H_6)NH_2^{\oplus}$ | 1 | 1 | 1 |
| D-6 | $C_4H_9-$ | $C_3H_7-$ | $H_3N^{\oplus}C_2H_4OC_2H_4N^{\oplus}H_3$ | 2 | 1 | 2 |
| D-7 | $C_8H_{17}-$ | $C_2H_5-$ | $HOC_2H_4NH_3^{\oplus}$ | 1 | 1 | 1 |
| D-8 | $C_2H_5-$ | $C_6H_{13}-$ | $H(OC_2H_4)_5NH_3^{\oplus}$ | 1 | 1 | 1 |
| D-9 | $CH_3CH(C_2H_5)CH_2CH_2CH_2-$ | H | $C_2H_4(OC_2H_4)_{10}NH_3^{\oplus}$ | 1 | 1 | 1 |
| D-10 | $CH_3C(CH_3)_2CH_2-$ | $CH_2C(CH_3)_2CH_2-$ | $H_3N^{\oplus}(C_2H_4NH)_2C_2H_4N^{\oplus}H_3$ | 2 | 1 | 2 |

TABLE E

| No. | R¹ | R² | Z | x | y | m |
|---|---|---|---|---|---|---|
| E-1 | $CH_3(CH_2)_7CH(CH_3)-$ | H | $HOC_2H_4NH_3^{\oplus}$ | 1 | 1 | 1 |
| E-2 | $CH_3C(CH_3)_2CH_2-$ | $CH_3CH_2-$ | $H_3N^{\oplus}C_6H_{12}N^{\oplus}H_3$ | 2 | 1 | 2 |
| E-3 | $(CH_3)_2CH-CH_2-$ | $(CH_3)_2CH-CH_2-$ | $CH_3NHC_6H_{12}NH_3^{\oplus}$ | 1 | 1 | 1 |
| E-4 | $CH_3CH(CH_3)C_3H_6CH(CH_3)-$ | H | $HO(C_2H_4O)_7C_3H_6NH_3^{\oplus}$ | 1 | 1 | 1 |
| E-5 | $C_8H_{17}-$ | $CH_3-$ | $CH_3N^{\oplus}H_2C_3H_6N^{\oplus}H_2CH_3$ | 2 | 1 | 2 |
| E-6 | $CH_3CH(CH_3)(CH_2)_2CH(CH_3)CH_2-$ | H | $C_6H_{13}NH_3^{\oplus}$ | 1 | 1 | 1 |
| E-7 | $CH_3(CH_2)_3CH(C_2H_5)CH_2-$ | H | $(HOC_2H_4)(C_4H_9)NH_2^{\oplus}$ | 1 | 1 | 1 |
| E-8 | $CH_3CH(CH_3)CH_2CH_2-$ | $C_4H_9-$ | $(HOC_4H_8)_2NH_2^{\oplus}$ | 1 | 1 | 1 |
| E-9 | $CH_3(CH_2)_2CH(CH_3)-$ | $CH_3-CH_2CH(CH_3)CH_2-$ | $H_3N^{\oplus}C_4H_8-NH_2C_4H_8N^{\oplus}H_3$ | 3 | 1 | 3 |
| E-10 | $CH_3(CH_2)_4-$ | $CH_3(CH_2)_3-$ | 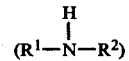 | 1 | 1 | 1 |

TABLE F

| No. | R¹ | R² | Z | x | y | m |
|---|---|---|---|---|---|---|
| F-1 | $CH_3(CH_2)_2CH(CH_3)-$ | $C_2H_5-$ | $HOC_4H_8NH_3^{\oplus}$ | 1 | 1 | 1 |
| F-2 | $CH_3C(CH_3)_2CH_2C(CH_3)_2-$ | H | $(CH_3)_3CNH_3^{\oplus}$ | 1 | 1 | 1 |
| F-3 | $CH_3(CH_2)_4-$ | $C_3H_7-$ | $H_2NC_6H_{12}NH_3^{\oplus}$ | 1 | 1 | 1 |
| F-4 | $CH_3CH(C_2H_5)(CH_2)_3-$ | $C_2H_5-$ | $CH_3NHC_6H_{12}NH_3^{\oplus}$ | 1 | 1 | 1 |
| F-5 | $CH_3(CH_2)_3CH(C_2H_5)CH_2-$ | H | $H_3N^{\oplus}C_5H_{10}N^{\oplus}H_3$ | 2 | 1 | 2 |
| F-6 | $CH_3(CH_2)_7-$ | $CH_3-$ | $(HOC_3H_6)_2NH_2^{\oplus}$ | 1 | 1 | 1 |
| F-7 | $CH_3CH(CH_3)CH(C_2H_5)CH_2-$ | H | $(C_3H_7)_3NH^{\oplus}$ | 1 | 1 | 1 |
| F-8 | $CH_3CH(CH_3)CH_2CH(CH_3)CH_2-$ | H | $(HOC_2H_4)(C_3H_7)NH_2^{\oplus}$ | 1 | 1 | 1 |
| F-9 | $CH_3CH_2C(CH_3)_2CH_2CH_2-$ | H | $(C_2H_5)_2NC_3H_6NH_3^{\oplus}$ | 1 | 1 | 1 |
| F-10 | $CH_3(CH_2)_5CH(CH_3)-$ | $CH_3$ | (morpholinium structure with $H_2N^{\oplus}$) | 1 | 1 | 1 |

Methods well known in the art for preparing amides and amine salts may be used to prepare the surface active, corrosion inhibiting salts according to formula (I). In one such method, one mole of the dicarboxylic acid reagent (e.g. maleic acid) is reacted with one mole of the primary monoamine reagent (e.g. 2-ethylhexyl amine) and then one mole of the resulting water insoluble amide product added to one mole of a water soluble monoalkanol amine (e.g. monoethanol amine) to form the amine salt of the free carboxylic acid group of the amide. The formation of the water insoluble carboxylic acid group containing amide product, for example, results from the reaction of one of the carboxylic acid groups of the dicarboxylic acid reagent with the amine group of the primary monoamine reagent and then the salt is obtained, for example, by the ionic interaction of the free carboxylic acid group of the amide product with the amine group of the water soluble monoalkanol amine. According to a second method for forming a surface active, corrosion inhibiting salt according to formula (I) one mole of a dicarboxylic acid reagent is reacted with one mole of a secondary amine reagent $(R^1-\underset{|}{\overset{H}{N}}-R^2)$ to obtain a water insoluble amide product having one free carboxylic acid group and then adding one mole of said amide product to one mole of a water soluble alkyl amine to form the amine salt of the free carboxylic acid group of the amide product. In preparing the water insoluble amide product having a free carboxylic acid group there may be employed a small molar excess of the dicarboxylic reagent or the primary or the secondary amine reagent. Preferably a small excess of the dicarboxylic acid reagent is employed. In the salt formation step there may be desirably employed as excess of the salt forming water soluble amine to insure essentially complete salt formation. In place of the dicarboxylic acid reagent (HOOC-R-COOH) there may be employed the corresponding anhydride or acyl halide in equal molar amount, to prepare the water insoluble amide product having a free carboxylic acid group. The use of elevated temperature and inert atmosphere, although optional, may be advantageous in the step for the preparation of the water insoluble amide product having a free carboxylic acid group. However, elevated temperatures and inert atmosphere are usually not necessary in the salt formation step for forming the salts according to formula (I). Inert solvents may be used in either or both the amide product formation step and the salt formation step for preparing the salts according to formula (I).

Water soluble or dispersible lubricants usable in the practice of the composition and method of this invention include synthetic and natural lubricants. As examples of natural lubricants there include petroleum oils, animal oils and fats, vegetable oils and fats and oils or marine origin. The petroleum oils may include paraffinic, naphthenic, asphaltic and mixed base oils. Among the synthetic lubricants are included hydrocarbon oils and halo-substituted hydrocarbon oils such as polymerized and interpolymerized olefins (e.g. polybutylenes, propylene/isobutylene copolymers, chlorinated polybutylenes, etc); alkyl benzenes (e.g. dodecylbenzene, tetradecylbenzene, dinonylbenzene, di(2-ethylhexyl) benzene, etc); polyphenyls (e.g., bi-phenyls, terphenyls, etc.); and the like. The alkylene oxide polymers and interpolymers and derivatives thereof where the terminal hydroxyl groups have been modified by esterification, etherification, etc., comprise another class of known synthetic lubricating oils. These are exemplified by the oils prepared by polymerization of ethylene oxide, propylene oxide, the alkyl and aryl ethers of these polyoxyalkylene polymers (e.g. methylpolyisopropylene glycol ether having an average molecular weight of 1000, diphenyl ether of polyethylene glycol having a molecular weight of 500 to 1000, diethyl ether or polypropylene glycol having a molecular weight of 1000 to 1500, etc.) or mono- and polycarboxylic esters thereof, for example, the acetic acid esters, mixed $C_3$–$C_8$ fatty acid esters, or the $C_{13}$ Oxo acid diester of tetraethylene glycol.

Other synthetic lubricants may include, for example, esters of dicarboxylic acids, (e.g. phthalic acid, succinic acid, maleic acid, azelaic acid, suberic acid, sebacic acid, fumaric acid, adipic acid, linoleic acid dimer, etc.) with a variety of alcohols (e.g. butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebecate, diisooctyl azelate, diisodecyl azelate, dioctyl phthalate, didecyl phthalate, dieicoxyl sebacate, and the 2-ethylhexyl diester of linoleic acid dimer.

Another useful class of synthetic lubricants include the silicone based oils such as, for example, polyalkyl-, polyaryl-, polyalkoxy-, or polyaryloxy-siloxane oils and silicate oils (e.g. tetraethyl silicate, tetraisopropyl silicate, tetra(2-ethylhexyl) silicate, tetra-(4-methyl-2-tetraethyl) silicate, tetra-(p-tert-butylphenyl) silicate, hexyl-(4-methyl-2-pentoxy) disiloxane, poly(methyl) siloxanes, poly(methylphenyl) siloxanes, etc.). Other synthetic lubricants include the esters of phosphorus-containing acids (e.g. tri-cresyl phosphate, trioctyl phosphate, diethyl ester of decane phosphonic acid, etc.), polymeric tetrahydrofurans, and the like.

There may also be used as the synthetic lubricant modified petroleum oils, such as, for example, the well known soluble oils obtained by the sulfonation of petroleum oil, modified animal oils and fats, such as the chlorinated and/or sulfonated animal oils and fats, and the modified vegetable oils and fats, such as, for example, the chlorinated and/or sulfonated vegetable oils and fats. Sulfurized natural oils are also useful in this invention.

As the second surface active agent usable in the practice of the corrosion inhibiting, aqueous functional fluid composition and the method of this invention there include the anionic, cationic, nonionic and amphoteric surface active agents. These surface active agents are particularly organic compounds and often more particularly synthetic organic compounds. However, naturally occuring compounds which are surface active agents are not excluded from the practice of this invention. Examples of anionic surface active agents include but are not limited to alkali salts of petroleum sulfonic acids, alkali metal salts of alkyl aryl sulfonic acids (e.g. sodium dodecyl benzene sulfonate), alkali metal, ammonium and amine soaps of fatty acids (e.g. sodium stearate), sodium dialkyl sulfosuccinate, sulfated oils (e.g. sulfated castor oil) alkali metal alkyl sulfates and sulfonated oils (e.g. sulfonated tallow). Cationic surface active agents include, for example, cetyl pyridinium bromide, hexadecyl morpholinium chloride, dilauryl triethylene tetramine diacetate, didodecylamine lactate, 1-amino-2-heptadecenyl imidazoline acetate, cetylamine acetate, tertiary ethoxylated soya amine and oleylamine acetate. As nonionic surface active agents there include, for example, alkylene oxide adducts of fatty alcohols (e.g. ethylene oxide adduct of oleyl alcohol), alkylene oxide adducts of alkyl phenols (e.g. ethylene oxide adduct of nonyl phenol), alkylene oxide adducts of fatty acids (e.g. tetraethylene glycol monopalmitate, monoethylene glycol dioleate and hexaethylene glycol monostearate), partial higher fatty acid esters of polyhydric alcohols (e.g. clycerol monostearate, sorbitan tristearate, glycerol dioleate and pentaerythritol tripalmitate), alkylene oxide condensates of polyhydric alcohols (e.g. ethylene oxide condensates of glycerol, sorbitol, mannitol and pentaerythritol) and alkylene oxide condensates of polyhydric alcohol partial esters (e.g. ethylene oxide condensate of sorbitan monolaurate, glycerol monooleate and pentaerythritol monostearate).

Among amphoteric surface active agents there are included, for example, alkyl-$\beta$-iminodipropionate, alkyl-$\beta$-amino-propionate, fatty imidazolines and betaines, more specifically 1-coco-5-hydroxyethyl-5-carboxymethyl imidazoline, dodecyl-$\beta$-alanine, N-dodecyl-N,N-dimethyl amino acetic acid and 2-trimethyl amino lauric acid inner salts.

The nonionic surface active agents are especially useful in the practice of the corrosion inhibiting, aqueous functional fluid composition and method of this invention. There may, however, be used a mixture of surface active agents of like or different types (e.g. mixture of nonionic surface active agents, mixture of anionic and nonionic surface active agents, mixture of cationic and nonionic surface active agents and a compatible mixture of cationic and anionic surface active agents). In some cases, surface active agents are known to have lubricating properties and such surface active agents can advantageously be employed in the practice of the corrosion inhibiting, aqueous functional fluid composition and method of this invention.

The concentration of the second surface active agent may vary widely in the practice of the corrosion inhibiting, aqueous functional fluid composition and method of this invention depending upon the nature of the surface active agents and the other components of the functional fluid composition. Thus, the amount of the surface active agent may vary depending upon whether it is a cationic or an anionic or a nonionic or an amphoteric surface active agent as well as its particular structure and molecular composition. Usually, the second surface active agent can be employed in an amount of from 0.002% to 10%, preferably from 0.01% to 5% based on the total weight of the corrosion inhibiting, aqueous functional fluid composition.

In accordance with this invention there is provided a corrosion inhibiting, aqueous functional fluid composition having a pH in the range of 8 to 12 comprising water, a salt according to formula (I), a second surface active agent and optionally a water soluble or dispersible lubricant. The amount of water in the functional fluid composition of this invention may vary over a wide range and is generally between 15% and 99.8% by weight based on the total weight of the corrosion inhibiting, aqueous functional fluid composition. Preferably the amount of water is from 40% to 99.5% by weight based on the total weight of the corrosion inhibiting, aqueous functional fluid composition. Under some circumstances a very small amount of water in the corrosion inhibiting, aqueous functional fluid composition would be desirable. Such a circumstance would be the more favorable economics obtained in shipping costs for a formulation having a low water content since water is not being shipped and the user is not paying for shipping water which he could just as well subsequently add prior to use to achieve the desired composition. The surface active, corrosion inhibiting salt according to formula (I) may be present in the aqueous functional fluid composition of this invention in an amount of from 0.002% to 50%, preferably 0.02% to 10%, by weight based on the total weight of the corrosion inhibiting, aqueous functional fluid composition. Under some use conditions, the surface active, corrosion inhibiting salt according to formula (I) may be present in the aqueous functional fluid composition in rather small amounts such as, for example, from 0.002% to 0.5% by weight based on the total weight of the composition. There can be present from 0.002% to 10%, preferably from 0.01% to 5%, by weight of a water soluble or dispersible lubricant, based upon the total weight of the corrosion inhibiting, aqueous functional fluid composition of this invention.

Among the preferred corrosion inhibiting, aqueous functional fluid compositions of this invention, prior to any dilution, are those comprising from 40% to 75% by weight water, from 1.0% to 10% by weight of a surface active, corrosion inhibiting salt according to formula (I) and from 0.5% to 5% by weight of a second surface active agent and 0.5% to 5% by weight of a water soluble or dispersible lubricant. Even more preferred corrosion inhibiting, aqueous functional fluid compositions according to this invention, prior to any dilution, are compositions comprising from 40% to 75% by weight of water, from 1.0% to 10% by weight of a surface active, corrosion inhibiting salt according to formula (I) wherein R is a monoethylenically unsaturated $C_2$ to $C_3$ aliphatic radical having two free valences in a cis stereo configuration, $R^1$ is a $C_7$ to $C_{10}$ aliphatic group having at least one methyl or ethyl branch, $R^2$ is hydrogen and Z is an alkanol amine cation and from 0.5% to 5% by weight of a second surface active agent and from 0.5% to 5% by weight of a water soluble or dispersible lubricant. There may be added to the corrosion inhibiting, aqueous functional fluid composition of this invention various other materials well known in the art to be added to functional fluids such as, for example, extreme pressure agents, antioxidants, additional corrosion inhibitors, bacteriocides and anti-foaming agents well known in the art in commonly used amounts usually from about 0.001% to about 15% by weight.

Methods commonly known in the art may be used to prepare the corrosion inhibiting, aqueous functional fluid compositions according to this invention. When utilizing such commonly known methods for mixing or blending together a plurality of materials, the order of addition of the water, the second surface active agent, the surface active, corrosion inhibiting, water soluble or dispersible alkali metal, ammonium or organic amine salt of a water insoluble carboxylic acid terminated amide having one amide linkage

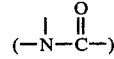

per molecule, or the salt according to formula (I), and the water soluble or dispersible lubricant may vary. Thus, for example, the surface active, corrosion inhibiting, water soluble or dispersible alkali metal, ammonium or organic amine salt of a water insoluble carboxylic acid terminated amide having one amide linkage

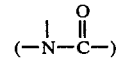

per molecule or the salt according to formula (I) may be added to and mixed into the water, the second surface active agent added, and then the water soluble or dispersible lubricant added to and mixed into the resulting mixture. Alternatively, for example, the water soluble or dispersible lubricant may be added to and mixed into the water, followed by the second surface active agent, and then the surface active, corrosion inhibiting, water soluble or dispersible alkali metal, ammonium or organic amine salt of a water insoluble carboxylic acid group terminated amide having one amide linkage

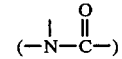

per molecule or the surface active, corrosion inhibiting salt according to formula (I) may be added to and mixed into the resulting mixture. Variations on these methods can be practiced, as would be well known to one skilled in the art. The surface active, corrosion inhibiting water soluble or dispersible alkali metal, ammonium or organic amine salt according to formula (I) may be formed in situ by the addition of the water insoluble carboxylic acid terminated amide having one amide linkage

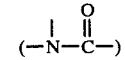

per molecule to the water containing the salt forming alkali metal, ammonium or organic amine compounds in the absence or presence of either or both of the second surface active agent and water soluble or dispersible lubricant when preparing the corrosion inhibiting, aqueous functional fluid composition according to this invention. In accordance with this invention there is provided a method of imparting corrosion inhibiting activity to an aqueous functional fluid having a pH in the range of 8 to 12 comprising the step of mixing together (a) a surface active, corrosion inhibiting, water soluble or dispersible alkali metal, ammonium or organic amine salt of a carboxylic acid terminated amide having one amide linkage $$(-N-C-)$$
$$\quad\;\; | \;\;\; ||$$
$$\quad\;\; \phantom{N} \;\;\; O$$

per molecule, (b) water, (c) a second surface active agent and optionally (d) a water soluble or dispersible lubricant. As one embodiment of the method of this invention there is provided a method comprising the step of mixing together (a) a corrosion inhibiting effective amount of a surface active, corrosion inhibiting water soluble or dispersible salt according to formula (I), (b) water, (c) a second surface active agent and optionally (d) a water soluble or dispersible lubricant. In accordance with a second embodiment there is provided a method for imparting corrosion inhibiting activity to an aqueous functional fluid having a pH in the range of 8 to 12 comprising the step of mixing together (a) a corrosion inhibiting effective amount of a surface active, corrosion inhibiting salt according to formula (I) wherein R is a monoethylenically unsaturated $C_2$ to $C_3$ aliphatic radical having two free valences in a cis stereo configuration, $R^1$ is a divalent $C_7$ to $C_{10}$ aliphatic group having at least one methyl or ethyl branch, $R^2$ is hydrogen and Z is an alkanol amine cation, (b) water, (c) a second surface active agent and optionally (d) a water soluble or dispersible lubricant. In another embodiment there is provided a method for imparting corrosion inhibiting activity to an aqueous functional fluid having a pH in the range of 8 to 12 comprising the step of mixing together (a) a corrosion inhibiting effective amount of a surface active, corrosion inhibiting salt according to formula (I) wherein R is the monoethylenically unsaturated $C_2$ to $C_3$ aliphatic group having two free valences in a cis stereo configuration, $R^1$ is the $C_7$ to $C_{10}$ aliphatic group having at least one methyl or ethyl branch and $R^2$ is hydrogen, (b) water, (c) a second surface active agent and optionally (d) a water soluble or dispersible lubricant. As a further embodiment there is provided a method for imparting corrosion inhibiting activity to an aqueous functional fluid having a pH in the range of 8 to 12 comprising the step of mixing together (a) a corrosion inhibiting effective amount of surface active, corrosion inhibiting salt according to formula (I) wherein R is the divalent cycloaliphatic radical and $R^1$ is the $C_7$ to $C_{10}$ aliphatic group having at least one methyl or ethyl branch, and $R^2$ is hydrogen, (b) water, (c) a second surface active agent and optionally (d) a water soluble or dispersible lubricant. In a still further embodiment there is provided a method for imparting corrosion inhibiting activity to an aqueous functional fluid having a pH in the range of 8 to 12 comprising the step of mixing together (a) a corrosion inhibiting effective amount of a surface active, corrosion inhibiting salt according to formula (I) wherein R is the monoethylenically unsaturated $C_2$ to $C_3$ aliphatic radical having two free valences in a cis stereo configuration, (b) water, (c) a second surface active agent and optionally (d) a water soluble or dispersible lubricant. The corrosion inhibiting effective amount of the surface active, corrosion inhibiting salt according to formula (I) may vary widely depending upon several factors, one of which may be the composition of the salt according to formula (I). However, the surface active, corrosion inhibiting salt according to formula (I) may be used in the method of this invention in an amount from about 0.002% to about 50%, preferably 0.002% to 10%, by weight based upon the total weight of the corrosion inhibiting, aqueous functional fluid composition.

The corrosion inhibiting, aqueous functional fluid composition and the product of the method of this invention are both useful as a hydraulic fluid and as a metal working fluid for metal working processes such as, for example, milling, turning, drilling, stamping, rolling, drawing and tapping.

Advantageously the aqueous functional fluid composition and the product of the method of this invention (a) inhibit or prevent corrosion of metal surfaces, particularly ferrous metal surfaces which come in contact with the fluid and (b) have a high resistance to separation of components. The surface active, corrosion inhibiting salts according to formula (I) advantageously exhibit good hydrolytic stability in the corrosion inhibiting aqueous functional fluid compositions of this invention.

This invention and the practice thereof is further described in the following non-limiting examples in which all amounts, proportions, ratios and percentages are by weight and all temperatures are in °F. (Fahrenheit) unless otherwise indicated.

In the following table (Table I) there is identified the various carboxylic acid terminated amides whose salts form the surface active, corrosion inhibiting salts in accordance with formula (I) used in the corrosion inhibiting, aqueous functional fluid compositions, in accordance with this invention, shown in the examples below.

TABLE I (A)
```
HC=CH
 |  |
HOOC C—N—(CH2)3—O—CH2—CH(CH2)3CH3
     ‖  |                |
     O  H                C2H5
```

(B)
```
HC=CH   CH3      CH3
 |  |    |        |
HOOC C—N—C—CH2—C—CH3
     ‖  |  |      |
     O  H  CH3    CH3
```

(C)
```
HC=CH
 |  |
HOOC C—N—CH2—CH—(CH2)3—CH3
     ‖  |      |
     O  H      C2H5
```

(D)
```
    COOH
   /
  |     (CH2)3—CH3
   \   /
    C—N
    ‖   \
    O    (CH2)3—CH3
```

(E)
```
HC=CH
 |  |
HOOC C—N—CH—CH2—O—CH—CH2—O—(CH2)11CH3
     ‖  |  |         |
     O  H  CH3       CH3
```

(F)
```
    COOH
   /
  |      (CH2)3—CH3
   \    /
    C—N
    ‖   \
    O    (CH2)3—CH3
```

TABLE I-continued
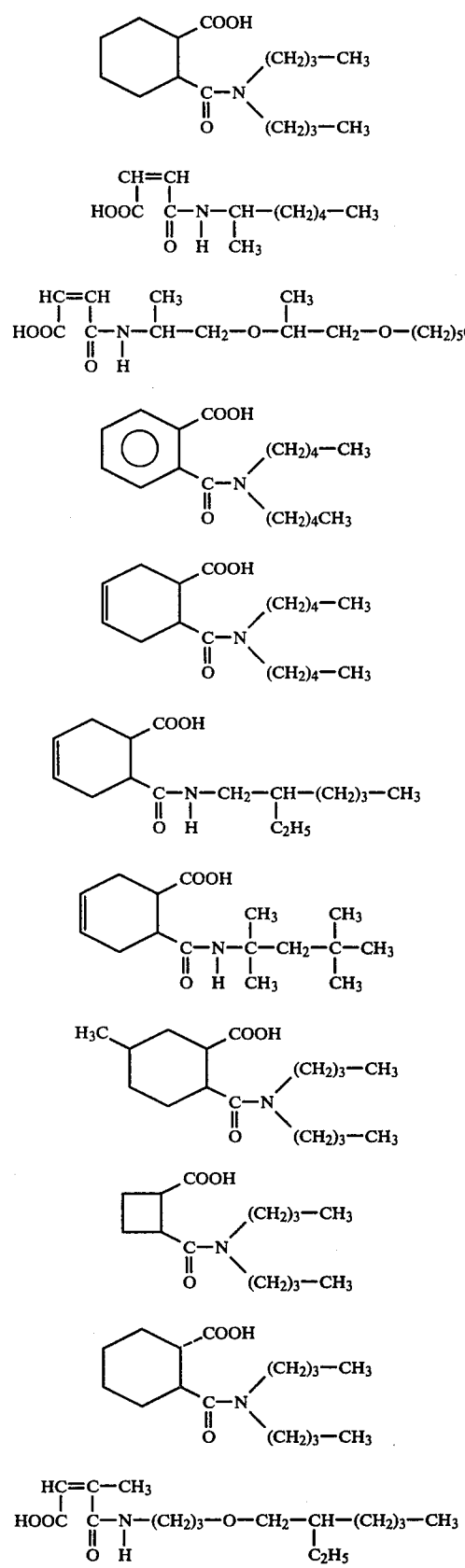
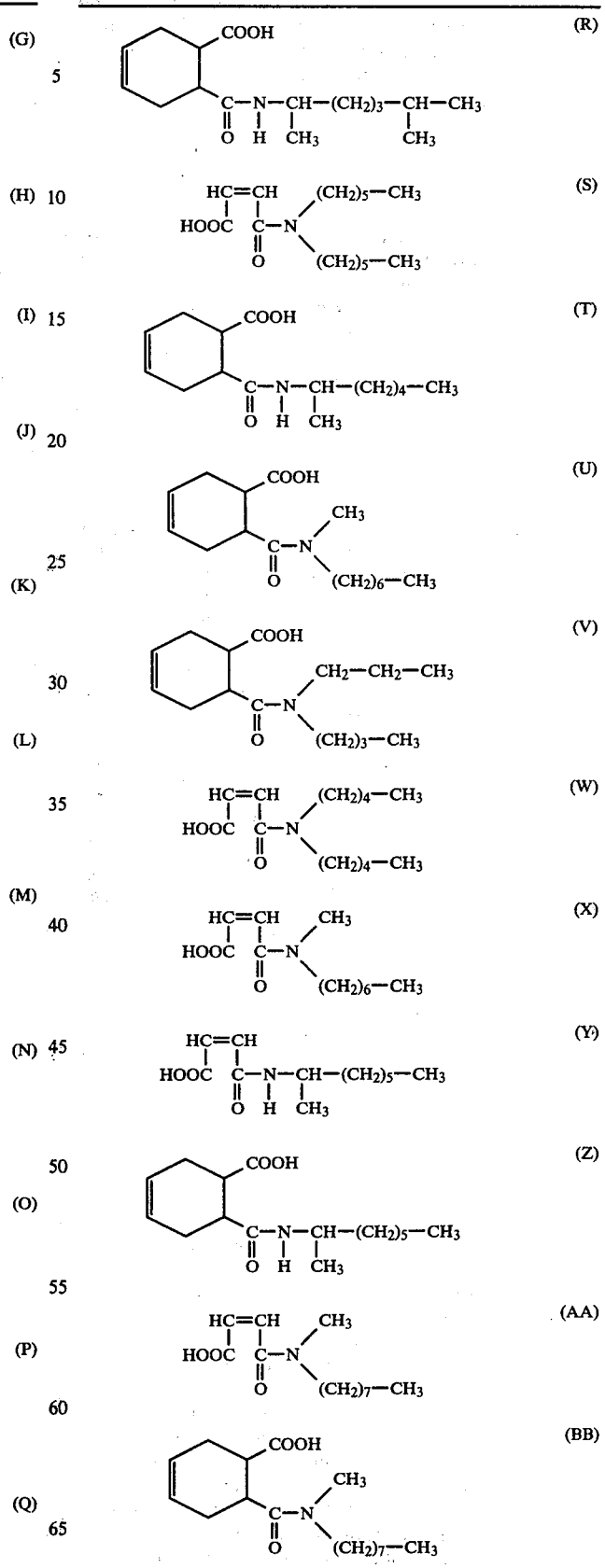

EXAMPLES 1 TO 28

Examples 1-28 demonstrate corrosion inhibiting, aqueous functional fluid compositions in accordance with this invention and the surface active behavior of various surface active, corrosion inhibiting salts according to formula (I) used in the corrosion inhibiting, aqueous functional fluid compositions in accordance with this invention. Such surface active behavior was ascertained in accordance with a well known method by preparing each of the formulations A, B and C indicated below for each of Examples 1 to 28 and observing the stability (i.e. resistance to separation) of those formulations upon keeping individual portions of those formulations at 40° F., room temperature (RT), and 130° F. for 48 hours. Each example reports, in Table II, the lowest concentration, of the three concentration levels investigated, at which the indicated salt produced a formulation that was stable at 48 hours of exposure to the above indicated temperatures.

| Material | Formulations | | |
|---|---|---|---|
| | A | B | C |
| | (Parts by weight) | | |
| Water | 72 | 70 | 68 |
| Surfonic ™ N-10* | 0.5 | 0.5 | 0.5 |
| Lubricant** | 2.5 | 2.5 | 2.5 |
| Monoethanolamine salt indicated in Table II | 2 | 4 | 6 |
| Ethanol amine borate | 23 | 23 | 23 |

TABLE II

| Example No. | Monoethanolamine salt of** | Minimum concentration level (% by wt.) of the salt |
|---|---|---|
| 1 | (A) | 2 |
| 2 | (B) | 6 |
| 3 | (C) | 4 |
| 4 | (D) | 4 |
| 5 | (E) | 2 |
| 6 | (F) | 4 |
| 7 | (G) | 4 |
| 8 | (H) | 4 |
| 9 | (I) | 2 |
| 10 | (J) | 2 |
| 11 | (K) | 4 |
| 12 | (L) | 4 |
| 13 | (M) | 6 |
| 14 | (N) | 4 |
| 15 | (O) | 6 |
| 16 | (P) | 4 |
| 17 | (Q) | 4 |
| 18 | (R) | 4 |
| 19 | (S) | 2 |
| 20 | (T) | 4 |
| 21 | (U) | 2 |
| 22 | (V) | 6 |
| 23 | (W) | 2 |
| 24 | (X) | 2 |
| 25 | (Y) | 2 |
| 26 | (Z) | 4 |
| 27 | (AA) | 2 |
| 28 | (BB) | 2 |

*ethylene oxide adduct of nonyl phenol; nonionic surfactant produced by the Texaco Chemical Company
Surfonic is a registered trademark of the Texaco Chemical Company
**polyethylene glycol polyester of dimer acid
***see Table I for the identity of the carboxylic acid terminated monoamides

EXAMPLE 29

This example teaches a corrosion inhibiting, aqueous functional fluid composition containing a natural oil according to this invention and shows the surface activity of (A).

| Formulation | |
|---|---|
| | (Parts by Weight) |
| Part A (material) | |
| Sodium petroleum sulfonate | 3.0 |
| Oleic diethanolamide | 8.0 |
| 200 SUS Coastal Pale Oil | 10.0 |
| Part B (material) | |
| Triethanolamine | 2.5 |
| (A) triethanolamine salt | 1.5 |
| Water | 75.0 |
| | 100.0 |

Part A and Part B were separately heated to 140° F. and then blended together by adding Part A to Part B with agitation. The resulting clear formulation showed stability (resistance to separation) upon exposure for 48 hours to each of 40° F., room temperature and 130° F. where as the comparable formulation omitting the triethanolamine salt of (A) separated at room temperature within 48 hours.

EXAMPLE 30

| Material | Formulation |
|---|---|
| | Parts by Weight |
| Water | 73.5 |
| Ethanol amine borate | 22.4 |
| Glycerol monooleate | 0.5 |
| (A) monoethanol amine salt | 3.6 |
| | 100.0 |

The formulation of this example was observed to be stable (i.e. no separation) at 48 hours of exposure to 40° F., room temperature and 130° F. However, when the monoethanol amine salt of (A) was omitted from the formulation separation occurred readily at room temperature.

EXAMPLES 31-36

These examples show the effect of the pH 8-12 condition on the stability of the corrosion inhibiting, aqueous functional fluid composition according to this invention. The stability test was conducted in accordance with the procedure described in Examples 1-28.

TABLE III

| Material | Example No. | | | | | |
|---|---|---|---|---|---|---|
| | 31 | 32 | 33 | 34 | 35 | 36 |
| Water (parts by weight) | 94.57 | 94.47 | 94.37 | 94.27 | 93.47 | 79.27 |
| Lubricant ① (parts by wt.) | 2.5 | 2.5 | 2.5 | 2.5 | 2.5 | 2.5 |
| Surfonic ® N-10 ② (parts by wt.) | 0.5 | 0.5 | 0.5 | 0.5 | 0.5 | 0.5 |
| (A) monoethlanolamine salt (parts by wt.) | 2.43 | 2.43 | 2.43 | 2.43 | 2.43 | 2.43 |
| Monoethanolamine (parts by wt.) | — | 0.10 | 0.20 | 0.30 | 1.10 | 15.30 |
| pH | 7.4 | 8.0 | 8.5 | 9.0 | 10.0 | 11.0 |
| 48 hr. stability at 40° F. | — | Stab. | Stab. | Stab. | Stab. | Stab. |
| 48 hr. stability at RT | Sep. | Stab. | Stab. | Stab. | Stab. | Stab. |
| 48 hr. stability at 130° F. | — | Stab. | Stab. | Stab. | Stab. | Stab. |

① polyethylene glycol polyester of dimer acid
② nonionic surfactant - ethylene oxide adduct of nonyl phenol produced by the Texaco Chemical Company. Surfonic is a registered trademark of the Texaco Chemical Company.

EXAMPLES 37-38

Various concentrations of the second surface active agent and the optional water soluble or dispersible lubricant in the practice of this invention are shown in these examples.

| Material | Example 37 | Example 38 |
|---|---|---|
| Water (parts by wt.) | 64.4 | 58.4 |
| Ethanolamine borate (parts by wt.) | 23 | 23 |
| Surfonic® N-10① (parts by wt.) | 0.1 | 10.0 |
| Lubricant② (parts by wt.) | 10.0 | 0.1 |
| Monoethanolamine salt of (A)③ (parts by wt.) | 2.5 | 8.5 |

① See Examples 1-28
② See Examples 1-28
③ See Table I for composition of (A)

Examples 39-40 show the surface activity for the cycloaliphatic compound (L), and the aromatic compound (J).

EXAMPLES 39-40

| Material | Example 39 | Example 40 |
|---|---|---|
| Water (parts by wt.) | 93.53 | 91.02 |
| Lubricant① (parts by wt.) | 2.50 | 2.50 |
| Surfonic® N-10② (parts by wt.) | 0.50 | 0.50 |
| (J)③ (parts by wt.) | 2.00 | |
| (L)③ (parts by wt.) | | 4.00 |
| Monoethanolamine (parts by wt.) | 1.47 | 1.98 |
| pH | 10 | 10 |
| Stability at 48 hrs. Room Temp. | Stab. | Stab. |
| Stability at 130° F. | Stab. | Stab. |
| Stability at 40° F. | Stab. | Stab. |

① See Examples 1-28
② See Examples 1-28
③ See Table I for the composition

The stability test was conducted in accordance with the procedure described in Examples 1-28.

EXAMPLES 41-63

Various compounds for forming the cations usable in the practice of this invention are shown in these examples, wherein the stability test was conducted in accordance with the procedure described in Examples 1-28.

| Material | Formulation Parts by weight |
|---|---|
| Water | 95-x |
| Lubricant* | 2.5 |
| Surfonic® N-10* | 0.5 |
| (A)** | 2.0 |
| Cation forming compound | x |

TABLE IV

| Example No. | Cation Forming Compound | x (Parts by wt) | pH | Stability at 48 hrs. at 40° F. | RT | 130° F. |
|---|---|---|---|---|---|---|
| 41 | Sodium hydroxide | 0.42 | 12.0 | Stab. | Stab. | Stab. |
| 42 | Sodium hydroxide | 0.3 | 10 | Stab. | Stab. | Stab. |
| 43 | Sodium hydroxide | 0.5 | 12.4 | Stab. | Stab. | Stab. |
| 44 | Potassium hydroxide | 0.6 | 10.8 | Stab. | Stab. | Stab. |
| 45 | Monoethanolamine | 1.5 | 10.0 | Stab. | Stab. | Stab. |
| 46 | Triethanolamine | 16.0 | 9.1 | Stab. | Stab. | Stab. |
| 47 | Monoisopropanolamine | 1.9 | 10.0 | Stab. | Stab. | Stab. |
| 48 | Diethanolamine | 7.2 | 10.0 | Stab. | Stab. | Stab. |
| 49 | Jeffamine® D-400① | 7.4 | 10.0 | Stab. | Stab. | Stab. |
| 50 | Jeffamine® T-403② | 6.1 | 10.0 | Stab. | Stab. | Stab. |
| 51 | Jeffamine® ED-900③ | 16.4 | 10.0 | Stab. | Stab. | Stab. |
| 52 | Ammonium hydroxide (28% ammonia) | 2.9 | 10.0 | Stab. | Stab. | Stab. |
| 53 | Jeffamine® D-230④ | 3.3 | 10.0 | Stab. | Stab. | Stab. |
| 54 | Jeffamine® ED-600⑤ | 10.9 | 10.0 | Stab. | Stab. | Stab. |
| 55 | Jeffamine® ED-2001⑥ | 13.0 | 9.0 | Stab. | Stab. | Stab. |
| 56 | Jeffamine® M-1000⑦ | 15.3 | 9.2 | Stab. | Stab. | Stab. |
| 57 | Ethylene diamine | 0.88 | 10.0 | Stab. | Stab. | Stab. |
| 58 | Diglycol amine | 2.90 | 10.0 | Stab. | Stab. | Stab. |
| 59 | Methoxyethoxypropylamine | 1.60 | 10.0 | Stab. | Stab. | Stab. |
| 60 | Morpholine | 4.25 | 9.5 | Stab. | Stab. | Stab. |
| 61 | Dimethyl aminopropylamine | 1.22 | 10.0 | Stab. | Stab. | Stab. |
| 62 | 2-ethyl-hexyl amine | 1.70 | 10 | | Unstable | |
| 63 | Jeffamine® D-2000⑧ | 12.4 | 9.0 | | Unstable | |

① polyoxypropylene diamine (total amine = 4.99 meq/gm; primary amine = 4.93 meq/gm) average molecular weight approximately = 400 - Texaco Chemical Co.
② primary amine terminated (triamine) propylene oxide adduct of 2,2-di-hydroxymethyl butanol having a total of about 5.3 oxypropylene units. Texaco Chemical Company
③ $H_2NCH(CH_3)CH_2(OCH(CH_3)CH_2)_a(OCH_2CH_2)_b(OCH_2CH(CH_3))_cNH_2$ wherein a + c is approximately 3.5 and b is approximately 20.5 - Texaco Chemical Co.
④ polyoxypropylene diamine (total amine = 8.45 meq/gm; Primary amine = 8.30 meq/gm) average molecular weight approximately = 230 - Texaco Chemical Company
⑤ $H_2NCH(CH_3)CH_2(OCH(CH_3)CH_2)_a(OCH_2CH_2)_b(OCH_2CH(CH_3))_cNH_2$ a + c = approximately 3.4; b = approximately 13.5; - Texaco Chemical Company
⑥ $H_2NCH(CH_3)CH_2(OCH(CH_3)CH_2)_a(OCH_2CH_2)_b(OCH_2CH(CH_3))_cNH_2$ a + c = approximately 3.5; b = approximately 45.5; - Texaco Chemical Company
⑦ $CH_3O(C_2H_4O)_{18.6}(CH_2CH(CH_3)O)_{1.6}CH_2CH(CH_3)NH_2$; Total amine = 0.85 meq/gm; primary amine = 0.83 meq/gm; - Texaco Chemical Company
⑧ polyoxypropylene diamine (total amine - 0.96 meq/gm; primary amine = 0.95 meq/gm) average molecular weight approx. = 2000 - Texaco Chemical Company
Jeffamine is a registered trademark of the Texaco Chemical Company
*See Examples 1-28
**See Table I

EXAMPLES 64-92

In these examples there are demonstrated the corrosion inhibiting activity in respect to ferrous metals for various salts of the carboxylic acid terminated amide in accordance with formula (I) usable in the practice of this invention. The metal (i.e. cast iron and steel) test specimens were prepared and tested in the following manner. The flat surface of the cast iron rod test piece was ground and lapped to obtain a uniform surface which was free of scratches, etchings, cross grains or other artifacts. The flat surface of the cast iron test piece was wiped clean with lens paper and then blown clean with air. Immediately after cleaning the cast iron test piece it was placed in a humidity box (100% relative humidity) and a small amount of the test fluid uniformly distributed over the ground and lapped flat surface of the cast iron test piece. The humidity box was then closed and sealed. The cast iron test piece was allowed to remain in the closed and sealed humidity box overnight and then removed for examination.

In the corrosion tests on steel plugs, the flat surface of the steel test pieces were prepared in the same manner as the surfaces of the cast iron test pieces (see above). A small amount of the test fluid was then uniformly distributed over the prepared surface of the steel test pieces after they had been placed in the humidity box. The humidity box was then closed and sealed and the steel test pieces kept in the box overnight. The steel test pieces were cleaned, allowed to dry and then examined.

The following formulations were tested in accordance with the above procedures and the indicated results obtained. For comparison, a formulation containing 99.5 parts by weight of water and 0.5 parts by weight of triethanolamine was also tested.

| Material | Formulation Parts by Weight |
|---|---|
| Water | 99.0 |
| Triethanolamine | 0.5 |
| Carboxylic acid terminated monoamide | 0.5 |

TABLE 5

| Example No. | Carboxylic acid terminated monoamide ① | Corrosion Results Cast Iron | Steel |
|---|---|---|---|
| 64 | — | Rust | Rust |
| 65 | (A) | No Rust | No Rust |
| 66 | (B) | " | " |
| 67 | (C) | " | " |
| 68 | (D) | " | " |
| 69 | (E) | " | " |
| 70 | (F) | " | " |
| 71 | (G) | " | " |
| 72 | (H) | " | " |
| 73 | (I) | " | " |
| 74 | (J) | " | " |
| 75 | (K) | " | " |
| 76 | (L) | " | " |
| 77 | (M) | " | " |
| 78 | (N) | " | " |
| 79 | (O) | " | " |
| 80 | (P) | " | " |
| 81 | (Q) | " | " |
| 82 | (R) | " | " |
| 83 | (S) | " | " |
| 84 | (T) | " | " |
| 85 | (U) | " | " |
| 86 | (V) | " | " |
| 87 | (W) | " | " |
| 88 | (X) | " | " |
| 89 | (Y) | " | " |
| 90 | (Z) | " | " |
| 91 | (AA) | " | " |
| 92 | (BB) | " | " |

① See Table I for the compositions of the carboxylic acid terminated monamides

EXAMPLES 93-99

The following formulations, after dilution at 5 parts of formulation to 95 parts of water were tested on cast iron and steel in accordance with the procedures described in Examples 64-92 and the results indicated in the table below were obtained.

| Material | Formulation Parts by weight |
|---|---|
| Water | 94-x |
| Triethanolamine | 5.0 |
| Surfonic® N-95 ① | 1.0 |
| Monoethanolamine salt | x |

TABLE VI

| Example No. | Monoethanolamine salt of | x (parts by wt.) | pH of the diluted fluid | Corrosion Result Cast Iron | Steel |
|---|---|---|---|---|---|
| 93 | — | — | 9.9 | rust | rust |
| 94 | (A)② | 2.0 | 9.9 | no rust | no rust |
| 95 | (A)② | 4.0 | 9.9 | no rust | no rust |
| 96 | (A)② | 6.0 | 9.9 | no rust | no rust |
| 97 | (W)③ | 2.0 | 9.9 | no rust | no rust |
| 98 | (W)③ | 4.0 | 9.9 | no rust | no rust |
| 99 | (W)③ | 6.0 | 9.9 | no rust | no rust |

① polyoxyethylene adduct of nonyl phenol - nonionic surface active agent produced by the Texaco Chemical Company
Surfonic is a registered trademark of the Texaco Chemical Company
② See Table I for composition
③ See Table I for composition

EXAMPLE 100

Five parts by weight of the formulation of Example 1, containing 2% by weight of the monoethanolamine salt of (A) (See Table 1 for composition), were diluted with 95 parts by weight of water and portions of the resulting fluid placed in two separate beakers. Freshly polished strips of copper and 7075 aluminum were then separately immersed in the fluid in each beaker for 24 hours, whereupon the copper and aluminum strips were removed and examined. The aluminum strip exhibited a very slight stain and the copper strip appeared free of stain.

EXAMPLES 101-106

Freshly polished 7075 aluminum strips were immersed in 100 grams of solutions having the following compositions for 24 hours and then examined for corrosion. The results are shown in Table VIII below.

| Material | Formulation Parts by Weight |
|---|---|
| Water | 99.9-x |
| Triethanolamine | 0.1 |
| Triethanolamine salt of the carboxylic acid terminated monoamide indicated | x |

-continued

| Material | Formulation Parts by Weight |
|---|---|
| in Table VIII below | |

TABLE VIII

| Example No. | Carboxylic acid terminated monoamide* | Conc. of salt (x) (parts by wt.) | pH | Corrosion |
|---|---|---|---|---|
| 101 | none | — | 9.5 | severe stain & etch |
| 102 | (A) | 0.15 | 8.3 | slight stain |
| 103 | (F) | 0.15 | 8.2 | slight stain |
| 104 | (I) | 0.15 | 8.2 | slight stain |
| 105 | (K) | 0.15 | 8.4 | light stain |
| 106 | (L) | 0.15 | 8.3 | light stain |

*See Table I for the identity of the carboxylic acid terminated monoamide

EXAMPLES 107–110

The use of the corrosion inhibiting, aqueous functional fluid compositions according to this invention as a metal working fluid is exemplified in these examples by evaluating the lubricity of the compositions in accordance with the following V-tool test procedure.

A wedge-shaped high-speed tool is forced against the end of a rotating (88 surface feet per minute) SAE 1020 steel tube of ¼ inch wall thickness. The feed force of the tool is sufficient to cut a V-groove in the tubing wall, and the chips flow out of the cutting area in two pieces (one piece from each face of the wedge-shaped tool). The forces on the tool as a result of workpiece rotation and of tool feed are measured by a tool post dynamometer connected to a Sanborn recorder. Any welding of chips to tool build-up is reflected in the interruption of chip-flow (visual) and in increased force and resistance to workpiece rotation. The cutting test is performed with the tool-chip interface flooded throughout the operation with circulating test fluid. Tool and workpiece are in constant dynamic contact during this time, and the test is not begun until full contact is achieved all along each cutting edge. The duration of the test is three minutes.

The following formulations after dilution with water at a ratio of 5 parts by weight of formulation to 95 parts by weight of water, were employed in the above described test procedure and the results obtained shown in Table IX below.

| Material | Formulations Parts by weight |
|---|---|
| Water | 74-x |
| Ethanolamine borate | 23.0 |
| Surfonic ™ N-10* | 0.5 |
| Lubricant** | 2.5 |
| Monoethanolamine salt of a carboxylic acid terminated amide - see Table below | x |

TABLE IX

| Example No. | Monoethanolamine salt of① | (Parts by wt.) | Force (lbs.) |
|---|---|---|---|
| 107 | (A) | 2 | 464 |
| 108 | (F) | 4 | 485 |
| 109 | (I) | 2 | 480 |

TABLE IX-continued

| Example No. | Monoethanolamine salt of① | (Parts by wt.) | Force (lbs.) |
|---|---|---|---|
| 110 | (W) | 2 | 474 |

*See Examples 1–28
**See Examples 1–28
① See Table I for the composition of the carboxylic acid terminated monoamides listed in this column.

What is claimed is:

1. A corrosion inhibiting, aqueous functional fluid composition having a pH in the range of from 8 to 12 comprising (a) water, (b) a surface active, corrosion inhibiting, water soluble or dispersible alkali metal, ammonium or organic amine salt of a water insoluble carboxylic acid group terminated amide having one amide linkage

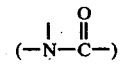

per molecule and (c) a second surface active agent, wherein (b) has the following formula

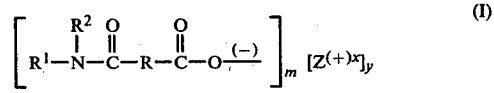

where
R is a divalent $C_4$ to $C_8$ cycloaliphatic radical,
$R^1$ is a monovalent organic radical selected from the group of:
  (a) a monovalent $C_7$ to $C_{10}$ aliphatic radical having at least one methyl or ethyl branch when $R^2$ is hydrogen, or
  (b) a monovalent $C_1$ to $C_9$ straight or branched chain aliphatic group when $R^2$ is a monovalent $C_1$ to $C_9$ straight or branched chain aliphatic group with the proviso that $R^1+R^2$ shall have a combined total of from 7 to 10 carbon atoms and at least one of $R^1$ or $R^2$ has at least 4 carbon atoms,
$R^2$ is hydrogen or a monovalent $C_1$ to $C_9$ branched or straight chain aliphatic group,
Z is an alkali metal cation or a nitrogen containing cation having at least one hydrogen attached to the nitrogen, a positive charge equal to x and selected from the group consisting of ammonium cation and cations of a water soluble alkanolamine having 2 to 4 carbon atoms in the alkanol group, $C_2$ to $C_6$ alkyl amine, alkyl alkanolamine having 1 to 6 carbon atoms in the alkyl group and 2 to 4 carbon atoms in the alkanol group, heteroaliphatic monoamine in which the heteroatom is oxygen, heteroaliphatic polyamine having oxygen or nitrogen heteroatoms, alkylene diamine having 2 to 6 carbon atoms in the alkylene group, N-alkyl or N-hydroxyalkyl substituted alkylene diamine having 2 to 6 carbon atoms in the alkylene group, morpholine, N-alkyl substituted morpholine or N-aminoalkyl substituted morpholine,
x is 1 to 3,
y is 1 and
m is 1 to 3

2. A corrosion inhibiting, aqueous functional fluid composition having a pH in the range of from 8 to 12 comprising (a) water, (b) a surface active, corrosion inhibiting, water soluble or dispersible alkali metal, ammonium or organic amine salt of a water insoluble carboxylic acid group terminated amide having one amide linkage

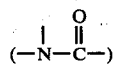

per molecule, (c) a second surface active agent and (d) a water soluble or dispersible lubricant, wherein (b) has the following formula

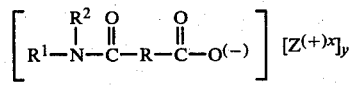

where
- R is a divalent $C_4$ to $C_8$ cycloaliphatic radical,
- $R^1$ is a monovalent organic radical selected from the group of:
  - (a) a monovalent $C_7$ to $C_{10}$ aliphatic radical having at least one methyl or ethyl branch when $R^2$ is hydrogen, or
  - (b) a monovalent $C_1$ to $C_9$ straight or branched chain aliphatic group when $R^2$ is a monovalent $C_1$ to $C_9$ straight or branched chain aliphatic group with the proviso that $R^1 + R^2$ shall have a combined total of from 7 to 10 carbon atoms and at least one of $R^1$ or $R^2$ has at least 4 carbon atoms,
- $R^2$ is a hydrogen or a monovalent $C_1$ to $C_9$ branched or straight chain aliphatic group,
- Z is an alkali metal cation or a nitrogen containing cation having at least one hydrogen attached to the nitrogen, a positive charge equal to x and selected from the group consisting of ammonium cation and cations of a water soluble alkanolamine having 2 to 4 carbon atoms in the alkanol group, $C_2$ to $C_6$ alkyl amine, alkyl alkanolamine having 1 to 6 carbon atoms in the alkyl group and 2 to 4 carbon atoms in the alkanol group, heteroaliphatic monoamine in which the heteroatom is oxygen, heteroaliphatic polyamine having oxygen or nitrogen heteroatoms, alkylene diamine having 2 to 6 carbon atoms in the alkylene group, N-alkyl or N-hydroxyalkyl substituted alkylene diamine having 2 to 6 carbon atoms in the alkylene group, morpholine, N-alkyl substituted morpholine or N-aminoalkyl substituted morpholine,
- x is 1 to 3
- y is 1 and
- m is 1 to 3

3. A corrosion inhibiting, aqueous functional fluid composition having a pH in the range of from 8 to 12 comprising (a) water, (b) a surface active, corrosion inhibiting, water soluble or dispersible alkali metal, ammonium or organic amine salt of a water insoluble carboxylic acid group terminated amide having one amide linkage

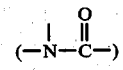

per molecule and (c) a second surface active agent, wherein (b) has the following formula

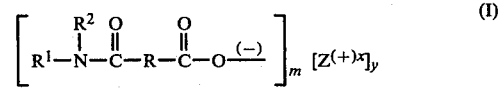

where
- R is a divalent aromatic radical,
- $R^1$ is a monovalent organic radical selected from the group of:
  - (a) a monovalent $C_7$ to $C_{10}$ aliphatic radical having at least one methyl or ethyl branch when $R^2$ is hydrogen, or
  - (b) a monovalent $C_1$ to $C_9$ straight or branched chain aliphatic group when $R^2$ is a monovalent $C_1$ to $C_9$ straight or branched chain aliphatic group with the proviso that $R^1 + R^2$ shall have a combined total of from 7 to 10 carbon atoms and at least one of $R^1$ or $R^2$ has at least 4 carbon atoms,
- $R^2$ is hydrogen or a monovalent $C_1$ to $C_9$ branched or straight chain aliphatic group,
- Z is an alkali metal cation or a nitrogen containing cation having at least one hydrogen attached to the nitrogen, a positive charge equal to x and selected from the group consisting of ammonium cation and cations of a water soluble alkanolamine having 2 to 4 carbon atoms in the alkanol group, $C_2$ to $C_6$ alkyl amine, alkyl alkanolamine having 1 to 6 carbon atoms in the alkyl group and 2 to 4 carbon atoms in the alkanol group, heteroaliphatic monoamine in which the heteroatom is oxygen, heteroaliphatic polyamine having oxygen or nitrogen heteroatoms, alkylene diamine having 2 to 6 carbon atoms in the alkylene group, N-alkyl or N-hydroxyalkyl substituted alkylene diamine having 2 to 6 carbon atoms in the alkylene group, morpholine, N-alkyl substituted morpholine or N-aminoalkyl substituted morpholine,
- x is 1 to 3,
- y is 1 and
- m is 1 to 3

4. A corrosion inhibiting, aqueous functional fluid composition having a pH in the range of from 8 to 12 comprising (a) water, (b) a surface active, corrosion inhibiting, water soluble or dispersible alkali metal, ammonium or organic amine salt of a water insoluble carboxylic acid group terminated amide having one amide linkage

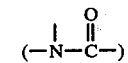

per molecule, (c) a second surface active agent and (d) a water soluble or dispersible lubricant, wherein (b) has the following formula

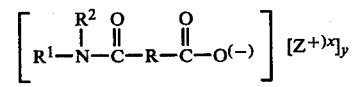

where
R is a divalent aromatic radical, $R^1$ is a monovalent organic radical selected from the group of:
  (a) a monovalent $C_7$ to $C_{10}$ aliphatic radical having at least one methyl or ethyl branch when $R^2$ is hydrogen, or
  (b) a monovalent $C_1$ to $C_9$ straight or branched chain aliphatic group when $R^2$ is a monovalent $C_1$ to $C_9$ straight or branched chain aliphatic group with the proviso that $R^1+R^2$ shall have a combined total of from 7 to 10 carbon atoms and at least one of $R^1$ or $R^2$ has at least 4 carbon atoms, $R^2$ is hydrogen or a monovalent $C_1$ to $C_9$ branched or straight chain aliphatic group, Z is an alkali metal cation or a nitrogen containing cation having at least one hydrogen attached to the nitrogen, a positive charge equal to x and selected from the group consisting of ammonium cation and cations of a water soluble alkanolamine having 2 to 4 carbon atoms in the alkanol group, $C_2$ to $C_6$ alkyl amine, alkyl alkanolamine having 1 to 6 carbon atoms in the alkyl group and 2 to 4 carbon atoms in the alkanol group, heteroaliphatic monoamine in which the heteroatom is oxygen, heteroaliphatic polyamine having oxygen or nitrogen heteroatoms, alkylene diamine having 2 to 6 carbon atoms in the alkylene group, N-alkyl or N-hydroxyalkyl substituted alkylene diamine having 2 to 6 carbon atoms in the alkylene group, morpholine, N-alkyl substituted morpholine or N-aminoalkyl substituted morpholine, x is 1 to 3
y is 1 and
m is 1 to 3

6. A corrosion inhibiting, aqueous functional fluid composition having a pH in the range of from 8 to 12 comprising (a) water, (b) a surface active, corrosion inhibiting, water soluble or dispersible alkali metal, ammonium or organic amine salt of a water insoluble carboxylic acid group terminated amide having one amide linkage

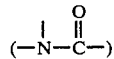

per molecule and (c) a second surface active agent, wherein (b) has the following formula

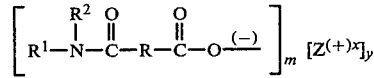

where
R is a divalent radical selected from the group consisting of a monoethylenically unsaturated $C_2$ to $C_3$ aliphatic radical having two free valences in a cis stereo configuration, $R^1$ is a monovalent organic radical selected from the group of:
  (a) a monovalent $C_7$ to $C_{10}$ aliphatic group having at least one methyl or ethyl branch or a monovalent heteroaliphatic group having at least one methyl or ethyl branch and the formula $R^3\text{--}(OR^4)_n$ (II) wherein $R^3$ is a straight chain or a methyl or ethyl branched $C_6$ to $C_{12}$ alkyl radical, $R^4$ is a $C_2$ to $C_3$ alkylene radical and n is 1 to 2 when $R^2$ is hydrogen, or
  (b) a monovalent $C_1$ to $C_{11}$ straight or branched chain aliphatic radical when $R^2$ is a $C_1$ to $C_{11}$ straight or branched chain monovalent aliphatic radical with the proviso that $R^1+R^2$ shall have a combined total of from 8 to 12 carbon atoms and at least one of $R^1$ or $R^2$ shall have at least 5 carbon atoms, $R^2$ is hydrogen or a monovalent $C_1$ to $C_{11}$ branched or straight chain aliphatic group, Z is an alkali metal cation or a nitrogen containing cation having at least one hydrogen attached to the nitrogen, a positive charge equal to x and selected from the group consisting of ammonium cation and cations of a water soluble alkyl alkanolamine having 1 to 6 carbon atoms in the alkyl group and 2 to 4 carbon atoms in the alkanol group, heteroaliphatic monoamine in which the heteroatom is oxygen, heteroaliphatic polyamine having oxygen or nitrogen heteroatoms, alkylene diamine having 2 to 6 carbon atoms in the alkylene group, N-alkyl or N-hydroxyalkyl substituted alkylene diamine having 2 to 6 carbon atoms in the alkylene group, morpholine, N-alkyl substituted morpholine or N-aminoalkyl substituted morpholine, x is 1 to 3,
y is 1 and
m is 1 to 3.

6. A corrosion inhibiting, aqueous functional fluid composition having a pH in the range of from 8 to 12 comprising (a) water, (b) a surface active, corrosion inhibiting, water soluble or dispersible alkali metal, ammonium or organic amine salt of a water insoluble carboxylic acid group terminated amide having one amide linkage

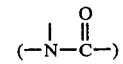

per molecule, (c) a second surface active agent and (d) a water soluble or dispersible lubricant, wherein (b) has the following formula

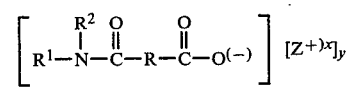

where
R is a divalent radical selected from the group consisting of a monoethylenically unsaturated $C_2$ to $C_3$ aliphatic radical having two free valences in a cis stereo configuration, $R^1$ is a monovalent organic radical selected from the group of:
  (a) a monovalent $C_7$ to $C_{10}$ aliphatic group having at least one methyl or ethyl branch or a monovalent heteroaliphatic group having at least one methyl or ethyl branch and the formula $R^3\text{--}(OR^4)_n$ (II) wherein $R^3$ is a straight chain or a methyl or ethyl branched $C_6$ to $C_{12}$ alkyl radical, $R^4$ is a $C_2$ to $C_3$ alkylene radical and n is 1 to 2 when $R^2$ is hydrogen, or
  (b) a monovalent $C_1$ to $C_{11}$ straight or branched chain aliphatic radical when $R^2$ is a $C_1$ to $C_{11}$ straight or branched chain monovalent aliphatic radical with the proviso that $R^1 + R^2$ shall have a combined total of from 8 to 12 carbon atoms and at least one of $R^1$ or $R^2$ shall have at least 5 carbon atoms, $R^2$ is hydrogen or a monovalent $C_1$ to $C_{11}$ branched or straight chain aliphatic group, Z is an alkali metal cation or a nitrogen containing cation having at least one hydrogen attached to the nitrogen, a positive charge equal to x and selected from the group consisting of ammonium cation and cations of a water soluble alkyl alkanolamine having 1 to 6 carbon atoms in the alkyl group and 2 to 4 carbon atoms in the alkanol group, heteroaliphatic monoamine in which the heteroatom is oxygen, heteroaliphatic polyamine having oxygen or nitrogen heteroatoms, alkylene diamine having 2 to 6 carbon atoms in the alkylene group, N-alkyl or N-hydroxyalkyl substituted alkylene diamine having 2 to 6 carbon atoms in the alkylene group, morpholine, N-alkyl substituted morpholine or N-aminoalkyl substituted morpholine, x is 1 to 3
y is 1 and
m is 1 to 3.

* * * * *